UNITED STATES PATENT OFFICE.

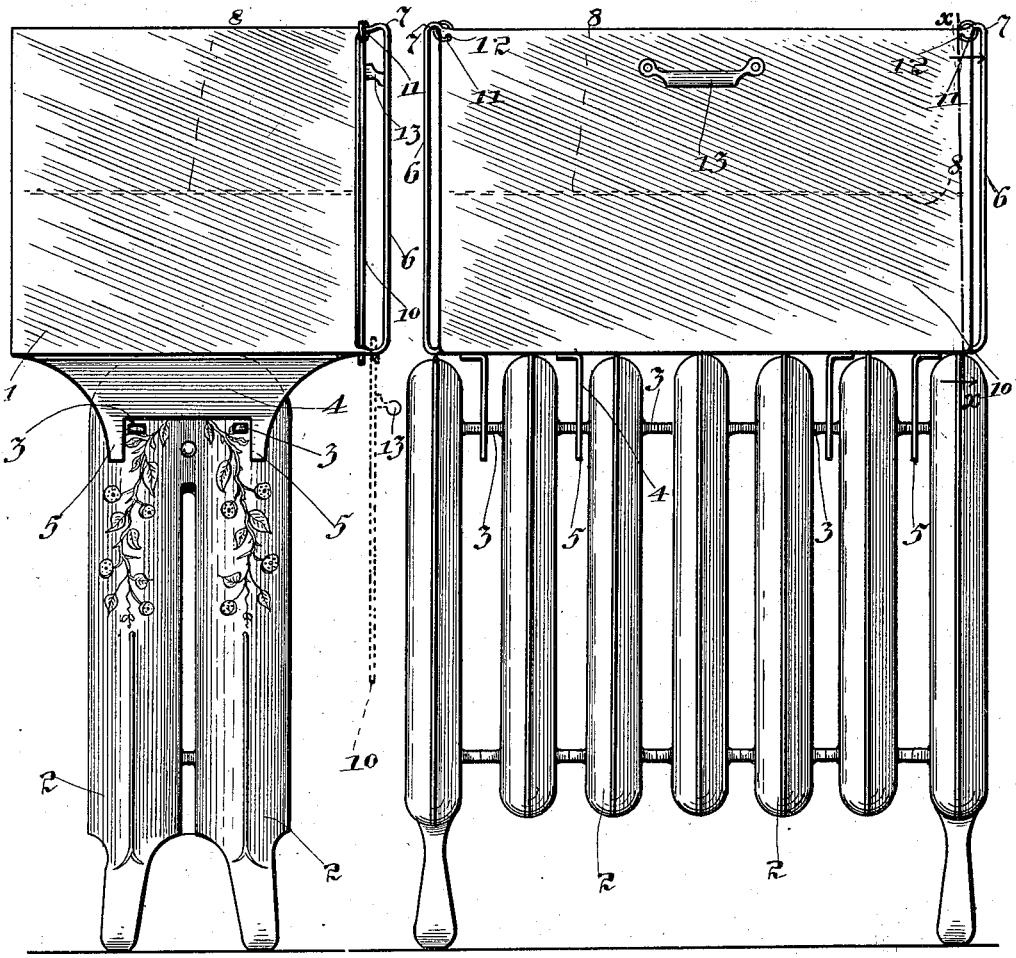

MAUD C. MUNSON, OF CHICAGO, ILLINOIS.

WARMING-OVEN.

1,014,325. Specification of Letters Patent. Patented Jan. 9, 1912.

Application filed July 21, 1911. Serial No. 639,736.

*To all whom it may concern:*

Be it known that I, MAUD C. MUNSON, a citizen of the United States, and a resident of the city of Chicago, county of Cook, and State of Illinois, have invented certain new and useful Improvements in Warming-Ovens, of which the following is a specification.

My invention relates to improvements in warming ovens designed for use in kitchens and dining rooms for warming plates or other dishes and also for keeping food in proper condition for serving.

The object of my invention is to provide a warming oven which shall be so constructed as to be readily attached to and supported by a steam or hot water radiator.

The invention consists in the combinations and arrangements of parts hereinafter described and claimed.

My invention will be best understood by reference to the accompanying drawing forming a part of this specification, and in which, Figure 1 is a side elevation of a warming oven embodying my invention, Fig. 2 is an end elevation thereof, Fig. 3 is a vertical section taken on line $x-x$ of Fig. 1 through the oven and showing a central partition provided therein, and Fig. 4 is a detail view showing a portion of an oven door.

The preferred form of construction as illustrated in the drawing comprises a rectangular sheet metal receptacle or oven 1 the width of which is somewhat greater than that of the coils 2 of an ordinary steam or hot water radiator. The ordinary spacing members 3 are provided between the coils 2, there being preferably a pair of these members between each coil as illustrated in Fig. 2. Depending from the bottom of the oven 1 is a plurality of transversely extending sheet metal plates 4 which are provided with depending projections 5 at the lower corners thereof. Projections 5 are so spaced as to engage over or embrace the spacing members 3 to prevent lateral movement of the oven after being placed upon the radiator, this feature being clear by reference to Fig. 2. While only a pair of plates or members 4 is necessary a greater number may be used as shown, if so desired, more than a pair of plates rendering the oven somewhat more stable and secure. Provided at each front corner of the oven 1 is a vertical guide rod 6 the upper end of which is provided with an upwardly extending bend 7 for a purpose to be described hereinafter.

The oven is divided into two compartments by means of a centrally arranged horizontal partition 8 which is provided with a series of perforations 9 to permit of free circulation of air between the compartments. These perforations are highly essential since the air of the lower compartment becomes heated much more readily than the air of the upper compartment due to the close proximity thereof with the radiator. It is clear that the perforations 9 permit the air of the lower and upper compartments to be maintained at an approximately uniform temperature. A drop door 10 for closing an opening in the front of the oven is provided with a pair of rings or eyes 11 which are loosely mounted in apertures 12 in the upper corners of said door. The eyes 11 are adapted to slide freely over the guide rods 6 when the door is being opened or closed, and when in the latter position said eyes seat on that portion of the guide rods 6 adjacent the bends 7 obviously preventing door 10 from accidentally dropping into open position. The door 10 is provided with a handle 13 by means of which the same is readily manipulated.

In the operation for opening the door 10 the eyes 11 are first drawn forwardly over the raised bent portions 7 whereupon the door will fall by gravity into the dotted line position as shown in Fig. 2. When in the latter position the door 10 serves as an apron protecting one from the heat radiating from the radiator and prevents the latter from being soiled by the accidental spilling of food.

When not in use the oven may be readily lifted or detached from the radiator and transported to a suitable place of storage. When its use is desired the same is firmly held in position on the radiator by simply properly placing the same thereon.

A warming oven as set forth in the foregoing is especially suitable for private use in kitchens and dining rooms and may be used in hotels and restaurants if so desired.

While I have illustrated and described the preferred form of construction for carrying my invention into effect, this is capable of variation and modification without departing from the spirit of the invention. I therefore do not wish to be limited to the precise details of construction as set forth, but desire to avail myself of such variations and modifications as come within the scope of the appended claims.

Having described my invention what I claim as new and desire to secure by Letters Patent is:

1. The combination with a steam or hot water radiator having spacing members between the coils thereof, of an oven adapted to be placed over the radiator, and positioning members depending from the bottom of the oven and engaging said spacing members, substantially as described.

2. In a device of the class described the combination with a steam or hot water radiator having a pair of spacing members between each coil thereof, of an oven placed over the radiator; and a plurality of transversely extending plates depending from the bottom of the oven and having downward projections for engaging over said spacing members, substantially as described.

3. The combination with a radiator having stop members between the coils thereof, of an oven adapted to be placed over the radiator; and positioning members on said oven and engaging said stop members, substantially as described.

In testimony whereof I have signed my name to this specification in the presence of two subscribing witnesses.

MAUD C. MUNSON.

Witnesses:
ARTHUR A. OLSON,
JOSHUA R. H. POTTS.

Copies of this patent may be obtained for five cents each, by addressing the "Commissioner of Patents, Washington, D. C."